(12) United States Patent
Moriizumi et al.

(10) Patent No.: US 9,969,125 B2
(45) Date of Patent: May 15, 2018

(54) VIBRATION WELDING DEVICE AND VIBRATION WELDING METHOD

(71) Applicant: HONDA MOTOR CO., LTD., Tokyo (JP)

(72) Inventors: Taiki Moriizumi, Utsunomiya (JP); Keiichi Kikawa, Utsunomiya (JP); Yushi Shinno, Ageo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 317 days.

(21) Appl. No.: 14/903,331

(22) PCT Filed: Apr. 30, 2014

(86) PCT No.: PCT/JP2014/062017
§ 371 (c)(1),
(2) Date: Jan. 7, 2016

(87) PCT Pub. No.: WO2015/004977
PCT Pub. Date: Jan. 15, 2015

(65) Prior Publication Data
US 2016/0144557 A1    May 26, 2016

(30) Foreign Application Priority Data
Jul. 10, 2013    (JP) .............................. 2013-144812

(51) Int. Cl.
*B32B 37/00*    (2006.01)
*B29C 65/78*    (2006.01)
(Continued)

(52) U.S. Cl.
CPC ...... *B29C 65/7841* (2013.01); *B29C 65/0618* (2013.01); *B29C 66/112* (2013.01); *B29C 66/114* (2013.01); *B29C 66/301* (2013.01); *B29C 66/30223* (2013.01); *B29C 66/532* (2013.01); *B29C 66/534* (2013.01); *B29C 66/61* (2013.01); *B29C 66/81431* (2013.01); *B29C 66/81435* (2013.01); *B29C 66/9512* (2013.01); *B29C 66/9516* (2013.01); *B29C 66/9592* (2013.01); *B60R 21/205* (2013.01); *B60R 21/2165* (2013.01); *B29C 66/542* (2013.01);
(Continued)

(58) Field of Classification Search
CPC ............ B29C 65/0618; B29C 65/7841; B29C 66/112; B29C 66/114; B29C 66/301; B29C 66/30223; B29C 66/532; B29C 66/534; B29C 66/61; B29C 66/81431; B29C 66/81435
USPC ....................................................... 156/73.5
See application file for complete search history.

(56) References Cited

U.S. PATENT DOCUMENTS 6,797,089 B2 * 9/2004 Brahm .................... B29C 65/06
156/73.5
8,118,957 B2 * 2/2012 Hisai .................. B29C 65/0618
156/580

FOREIGN PATENT DOCUMENTS

JP    2007-091024    4/2007

* cited by examiner

*Primary Examiner* — James Sells
(74) *Attorney, Agent, or Firm* — Rankin, Hill & Clark LLP (57) ABSTRACT

This vibration welding device is a device that vibration welds an airbag holding box and an installment panel having a tear line. The vibration welding device is provided with a support jig that carries and affixes the installment panel during vibration welding. The support jig is provided with a (Continued)

groove that permits thermal expansion during vibration welding of the installment panel at a position differing from the tear line.

6 Claims, 10 Drawing Sheets (51) Int. Cl.
*B29C 65/00* (2006.01)
*B29C 65/06* (2006.01)
*B60R 21/205* (2011.01)
*B60R 21/2165* (2011.01)
*B29L 31/30* (2006.01)

(52) U.S. Cl.
CPC .................. *B29L 2031/3008* (2013.01); *B29L 2031/3038* (2013.01)

DISPLACEMENT AMOUNT OF INSTRUMENT
PANEL AT TIME OF VIBRATION WELDING

WIDTH $\alpha$ OF GROOVE PORTION

FIG. 8B

DISPLACEMENT AMOUNT OF
INSTRUMENT PANEL AFTER COOLING

WIDTH $\alpha$ OF
GROOVE
PORTION

VIBRATION WELDING DEVICE AND VIBRATION WELDING METHOD

TECHNICAL FIELD

The present invention relates to a vibration welding device and a vibration welding method for vibration welding a plurality of workpieces.

BACKGROUND ART

Heretofore, in the case that workpieces made of resin or the like are joined together, vibration welding has been carried out in which a vibratory force is applied to the workpieces, whereby parts to be welded of the workpieces are heated and joined. In vibration welding, there is no need for adhesives, and further, after the welding process, there is no need for heat drying or the like. Thus, vibration welding is suitable for joining together interior members or components of an automobile.

For example, in Japanese Laid-Open Patent Publication No. 2007-091024, a technique is disclosed in which an air bag chute is attached to an instrument panel of an automobile by vibration welding. In this case, so that the instrument panel can be broken smoothly when the airbag is deployed, a tear line, which is a breakable portion (a cutout portion, i.e., a groove-shaped thin portion), is disposed on the instrument panel. The instrument panel and the airbag chute are joined by vibration welding while sandwiching the cutout portion therebetween.

SUMMARY OF INVENTION

Incidentally, concerning the instrument panel of an automobile, the quality of the external appearance thereof is important, and thus it is preferable to fabricate the instrument panel so that the joined portions of internal components cannot easily be distinguished. However, with an instrument panel equipped with a cutout portion, the location where the cutout portion is formed becomes deformed due to thermal effect on the instrument panel at the time of vibration welding, whereby after such vibration welding is carried out, a depression (deformation) tends to be produced along the cutout portion on a face (surface) opposite from the cutout portion. When such a deformation is produced, the appearance of the instrument panel worsens and thus the quality in external appearance of the instrument panel is deteriorated.

The present invention has been devised while taking into consideration the aforementioned circumstances, and has the object of providing a vibration welding device and a vibration welding method in which, when a workpiece having a cutout portion is subjected to vibration welding, a condition of deformation of the workpiece due to thermal expansion is guided by way of a simple structure, and thus after vibration welding, the product quality of the workpiece can be enhanced.

For achieving the aforementioned objects, the present invention is characterized by a vibration welding device with which a first workpiece having a cutout portion therein, and a second workpiece are stacked and vibration welded, comprising a fixing part configured to place and fix the first workpiece thereon, so that the cutout portion of the first workpiece faces toward the second workpiece during vibration welding, wherein the fixing part comprises a space configured to allow thermal expansion of the first workpiece during vibration welding, at a position overlapping with the cutout portion of the first workpiece in a fixed state of the first workpiece.

According to the above features, the vibration welding device, by means of a simple structure including the space disposed at a position overlapping with the cutout portion of the first workpiece, deformation of the first workpiece after vibration welding can be suppressed significantly. More specifically, although the first workpiece in the vicinity of the cutout portion is subjected to thermal expansion by heat produced at the time of vibration welding, and easily bulges or is raised in the thickness direction due to narrowing of the cutout portion, even if the first workpiece expands and bulges, such expansion and bulging can escape into the space that exists on the opposite side from the cutout portion. Owing thereto, accompanying cooling after vibration welding, the thermally expanded portion of the first workpiece that has moved into the space is suitably returned to its original location. Thus, after vibration welding, the first workpiece exhibits superior product quality without any (or almost no noticeable) depression in the vicinity where the cutout portion is formed.

In this case, the fixing part preferably fixes the first workpiece, for a deep part of the cutout portion to be located in a central portion in a widthwise direction of the space.

In this manner, by fixing the first workpiece, during vibration welding, the vibration welding device is capable of allowing the thermally expanded portion on both sides in the vicinity of the cutout portion of the first workpiece to escape evenly into the space. Thus, after cooling upon completion of vibration welding, the thermally expanded portion in the vicinity of the cutout portion can return evenly, and a reduction in the occurrence of a depression can be further enhanced.

Further, the fixing part may include a position adjusting mechanism configured to enable a width or position of the space to be adjusted.

In this manner, by providing the position adjusting mechanism that enables a width or position of the space to be adjusted, the vibration welding device is capable of suitably adjusting the amount at which the first workpiece is displaced corresponding to the width of the space. Accordingly, after vibration welding, the condition of the first workpiece can easily be adjusted. Further, corresponding to the amount of heat, etc., at the time of vibration welding, or a change in the shape of the first or second workpiece (shape, material or thickness of the cutout portion, etc.), since the need to prepare a plurality of fixing parts is eliminated, versatility is increased.

Furthermore, the second workpiece preferably comprises a plurality of welding parts, and the space preferably is disposed between the welding parts in a fixed state of the second workpiece.

In this manner, when the space is disposed between the welding parts with the second workpiece fixed in position, the thermally expanded portion of the first workpiece due to the influence of heat of the welding parts generated during vibration welding can be made to move reliably into the space.

The first workpiece may be an instrument panel of an automobile, and the second workpiece may be a retaining member of an airbag to be deployed into interior of the automobile at a predetermined timing, the retaining member configured to be welded to the instrument panel. The cutout portion may be a breakable portion to be broken accompanying deployment of the airbag.

Consequently, in a structure in which the airbag is attached to the instrument panel of an automobile, the state of the surface of the instrument panel is such that the retaining member of the airbag cannot be discerned.

Further, for achieving the objects described above, the present invention is characterized by a vibration welding method, by which a first workpiece having a cutout portion therein, and a second workpiece are stacked and vibration welded. The method comprises a fixing step of fixing the first workpiece with respect to a fixing part that is capable of placing and fixing the first workpiece so that the cutout portion thereof faces toward the second workpiece, and so that the cutout portion overlaps with a space of the fixing part, and a vibration welding step of, after the fixing step, vibration welding the first workpiece and the second workpiece by applying a vibration force to the first and second workpieces, while allowing thermal expansion of the first workpiece to escape into the space.

According to the present invention, in the case that a workpiece having a cutout portion is subjected to vibration welding, by means of a simple structure, the product quality of the workpiece after vibration welding thereof can be enhanced.

DESCRIPTION OF EMBODIMENTS

Hereinafter, a preferred embodiment of a vibration welding device, in relation to a vibration welding method according to the present invention, will be described in detail below with reference to the accompanying drawings.

The vibration welding device according to the present invention includes a function to vibration weld predetermined interior components onto an instrument panel (dashboard) of an automobile. In particular, the vibration welding device is configured to attach a predetermined structural object (an airbag, etc.) to an inner side (outside of the vehicle compartment) of a passenger seat front portion of the instrument panel. Below, to facilitate understanding of the present invention, first, a description will be given concerning attachment of an airbag to the instrument panel.

In the description of the instrument panel given below, a surface that is exposed to the vehicle compartment will be referred to as a front surface, whereas a surface that faces outside from the vehicle compartment on an opposite side from the front surface will be referred to as a rear surface. Further, in the case of describing directions of the instrument panel, the front window side will be referred to as a front side, and the passenger seat side will be referred to as a rear side corresponding to front and rear directions of the automobile (see FIG. 2).

Figure 1:
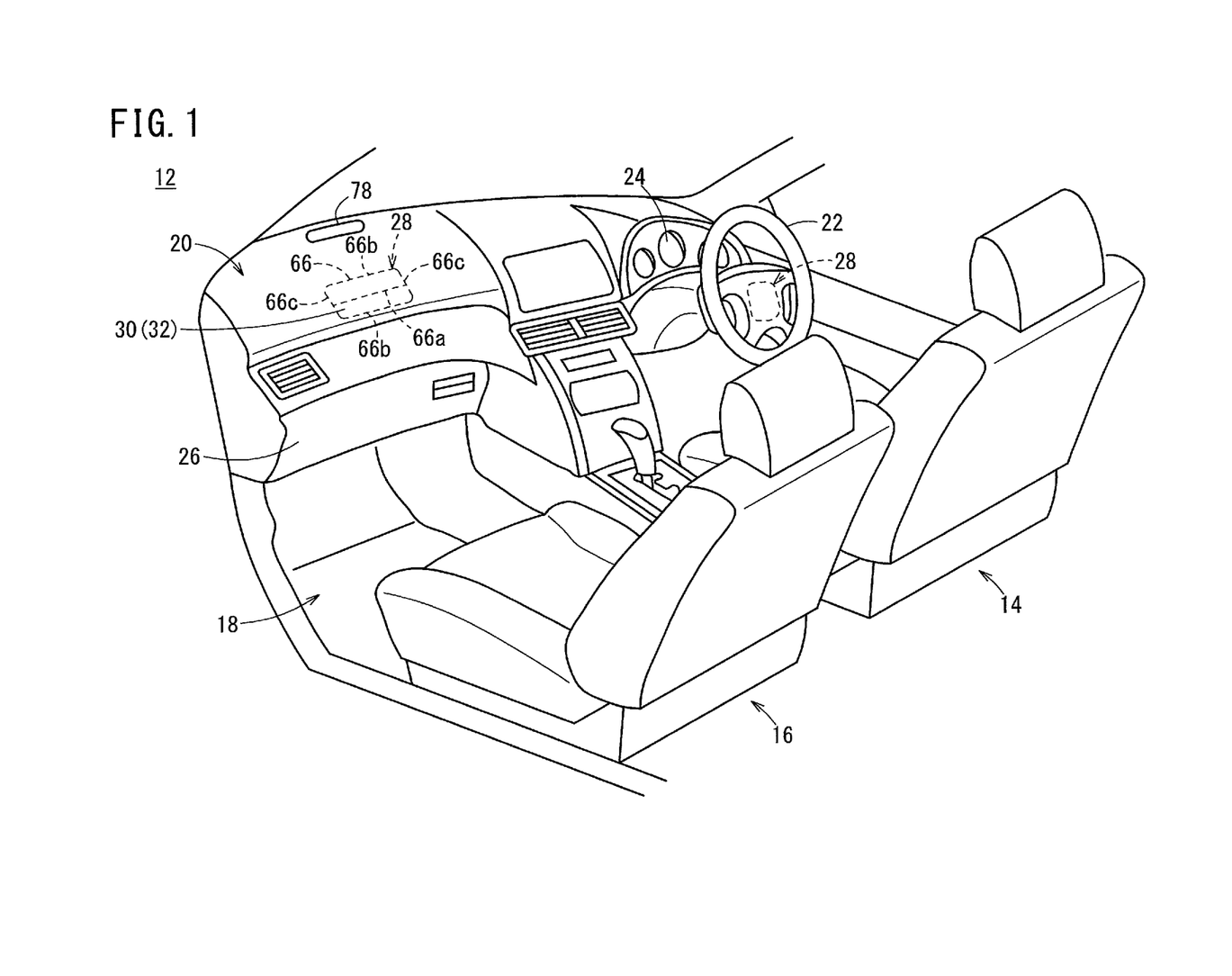
FIG. 1 is a perspective view showing an instrument panel on which a vibration welding device according to an embodiment of the present invention carries out vibration welding.

As shown in FIG. 1, a vehicle 12 comprises a driver's seat 14 and a passenger seat 16 in the interior of a vehicle compartment 18, and an instrument panel 20 (first workpiece: also referred to as an instrument panel 20 below) in front of the passenger seat 16. A steering handle 22 together with meters and gauges 24 are provided on the driver's seat 14 side of the instrument panel 20. A glove box 26, for example, is provided on the passenger seat 16 side of the instrument panel 20.

An airbag unit 28 is provided for the purpose of protecting a vehicle occupant by expanding and deploying at the time of a collision of the vehicle 12. In the case of the driver's seat 14, the airbag unit 28 is disposed on a rear surface of a wall portion that constitutes a central part (shaft portion) of the steering handle 22, and in the case of the passenger seat 16, the airbag unit 28 is disposed on a rear surface 34 of the instrument panel 20 on a more upward side than the glove box 26. Further, on the rear surface 34 of the instrument panel 20 on the side of the passenger seat 16, apart from the airbag unit 28, a duct (not shown) is provided for adjustment of air conditioning in the vehicle compartment 18.

Figure 2:
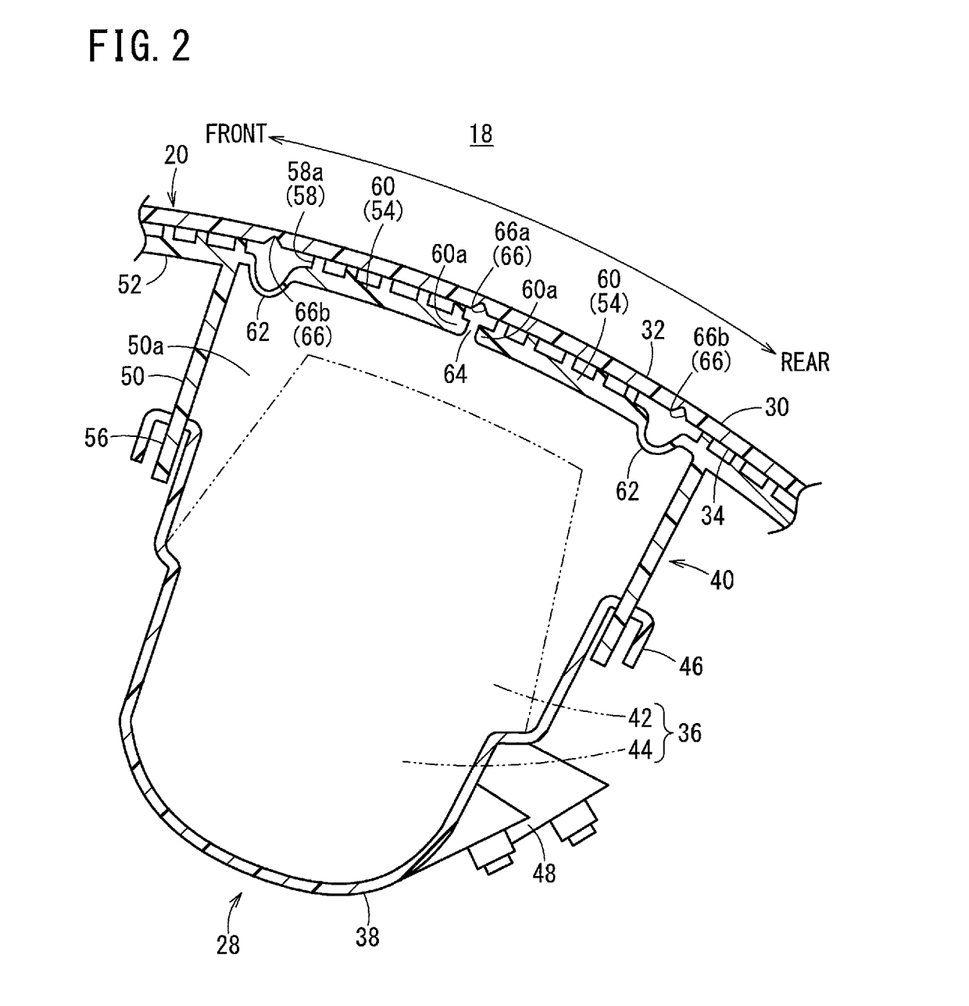
FIG. 2 is a cross-sectional view showing an attached state of an airbag unit and the instrument panel of FIG. 1.

As shown in FIG. 2, the airbag unit 28 on the side of the passenger seat 16 is attached so as to be capable of deploying into the vehicle compartment 18 (in front of an occupant of the passenger seat 16) from the rear surface 34 of the instrument panel 20. The airbag unit 28, for example, is equipped with an airbag device 36, a support frame 38 that supports the airbag device 36, and a retaining box 40 (second workpiece: retaining member) in which the support frame 38 is held.

The airbag device 36 comprises an airbag 42 that is formed in the shape of a bag, and an inflator 44 that supplies air to the airbag 42. The airbag 42 is folded and accommodated in the support frame 38 and in the interior of the retaining box 40, at normal times when a collision or the like does not occur. At the time of a collision, the airbag 42 is constituted so as to expand outwardly based on supply of air from the inflator 44.

The support frame 38 has an open upper portion and exhibits a frame structure that accommodates the aforementioned airbag device 36 in the interior thereof. On a side portion of the upper opening of the support frame 38, hook parts 46 are provided for hooking the support frame 38 onto the retaining box 40. Further, in order to reliably support the airbag device 36, the support frame 38 includes a mounting part 48 that is screwed to a vehicle body frame (not shown).

The retaining box 40 indirectly supports the airbag device 36 by being fixed so that the support frame 38 hangs downwardly. The retaining box 40 comprises a retaining wall (walls) 50 that retains the support frame 38, a flange member 52 connected to one end side of the retaining wall 50 and projecting outwardly therefrom, and door portions 54 disposed on an inner side and connected in the same manner to the one end side of the retaining wall 50.

The retaining wall 50 is formed in the shape of a rectangular tube, and includes on the inner side thereof a space 50a capable of accommodating the airbag device 36. Hooking portions 56 in which the hook parts 46 are hooked are provided on a projecting end part (other end part) of the retaining wall 50.

The flange member 52 projects out at a predetermined length along the shape of the rear surface 34 side of the instrument panel 20. Welding parts 58, which are vibration welded on the instrument panel 20, are disposed on an upper surface (a surface facing toward the rear surface 34 of the instrument panel 20) of the flange member 52.

On the other hand, the door portions 54 are formed by a pair of door plates 60, which are divided into front and rear parts at a center portion in the forward/rearward direction. The pair of door plates 60 is separated from the retaining walls 50 on both left and right sides of the retaining box 40, and is connected respectively through hinge members 62 to the retaining walls 50 on both front and rear sides of the retaining box 40. The hinge members 62 are portions formed with thinner walls than the walls of the door portions 54 or the flange member 52, and allow the door plates 60 to swing freely. Therefore, the two door plates 60 in a pair are capable of opening as double doors toward the side of a front surface 32 of the instrument panel 20, to thereby widen or spread a gap 64 in the front and rear center portion. Similar to the flange member 52, the welding parts 58, which are vibration welded on the instrument panel 20, are disposed on upper surfaces (surfaces facing toward the instrument panel 20) of the door portions 54.

The welding parts 58 are portions that are directly welded to the rear surface 34 of the instrument panel 20, and are formed as protrusions 58a (ribs) disposed in plurality on upper surfaces of the flange member 52 and the door portions 54. The respective protrusions 58a project at the same degree from the upper surfaces of the flange member 52 and the door portions 54 along the rear surface 34 of the instrument panel 20. On upper surfaces of the flange member 52 and the door portions 54, the respective protrusions 58a of the welding parts 58 may be constituted in the form of a lattice shape, a net-like shape, or a striped pattern.

The door portions 54 are welded to the instrument panel 20 so as to include the gap 64 of a predetermined width between projecting ends 60a of the pair of door plates 60. The welding parts 58 are disposed in proximity to the projecting ends 60a of the door plates 60. At the connected portions between the retaining walls 50 and the pair of door plates 60, the welding parts 58 are disposed in the vicinity of the hinge members 62, however, the welding parts 58 are not disposed on the hinge members 62.

The instrument panel 20 to which the retaining box 40 is welded has a predetermined wall thickness and is formed to exhibit a complex curved surface. A peripheral edge portion of the instrument panel 20 is fixed to the vehicle body frame. As shown in FIG. 1, on the front surface 32 of the instrument panel 20 on the side of the passenger seat 16, an attachment portion of the airbag unit 28 is formed with a relatively smooth surface, and is capable of allowing the airbag 42 to be deployed smoothly in front of the passenger seat.

As shown in FIG. 2, although the rear surface 34 of the instrument panel 20 is formed as a substantially smooth surface similar to the front surface 32, a tear line 66 (cutout portion) is provided at a predetermined position (airbag mounting portion 30). The tear line 66 serves as a breakable portion that prompts opening of the door portions 54, by breaking the instrument panel 20 when the airbag 42 is deployed. As shown in FIG. 1, the tear line 66 is formed with a predetermined shape corresponding to the shape of the airbag unit 28 (the pair of door plates 60).

More specifically, the tear line 66 includes a first line 66a facing toward the gap 64 between the projecting ends 60a of the pair of door plates 60, and a pair of second lines 66b facing toward the pair of hinge members 62. Further, the tear line 66 includes third lines 66c that connect the end portions of the first and second lines 66a, 66b, and face toward left and right detached locations between the retaining walls 50 and the door portions 54. More specifically, the second lines 66b and the third lines 66c form an endless ring that goes around the inside vicinity of the retaining walls 50, and the first line 66a is connected to the third lines 66c crossing the center of the ring in the lateral direction.

At a time of deployment of the airbag unit 28, the pair of door plates 60 is pushed toward the side of the front surface 32 of the instrument panel 20 due to the expansive force of the airbag 42, and a location where the first line 66a of the instrument panel 20 is formed breaks. At this time, the locations where the second lines 66b of the instrument panel 20 are formed bend (or break) responsive to the hinge members 62, whereas the locations where the third lines 66c of the instrument panel 20 are formed break along the detached locations between the retaining walls 50 and the door portions 54. As a result, the airbag 42 flies out from the instrument panel 20 in a predetermined direction of the vehicle compartment 18.

Figure 3:
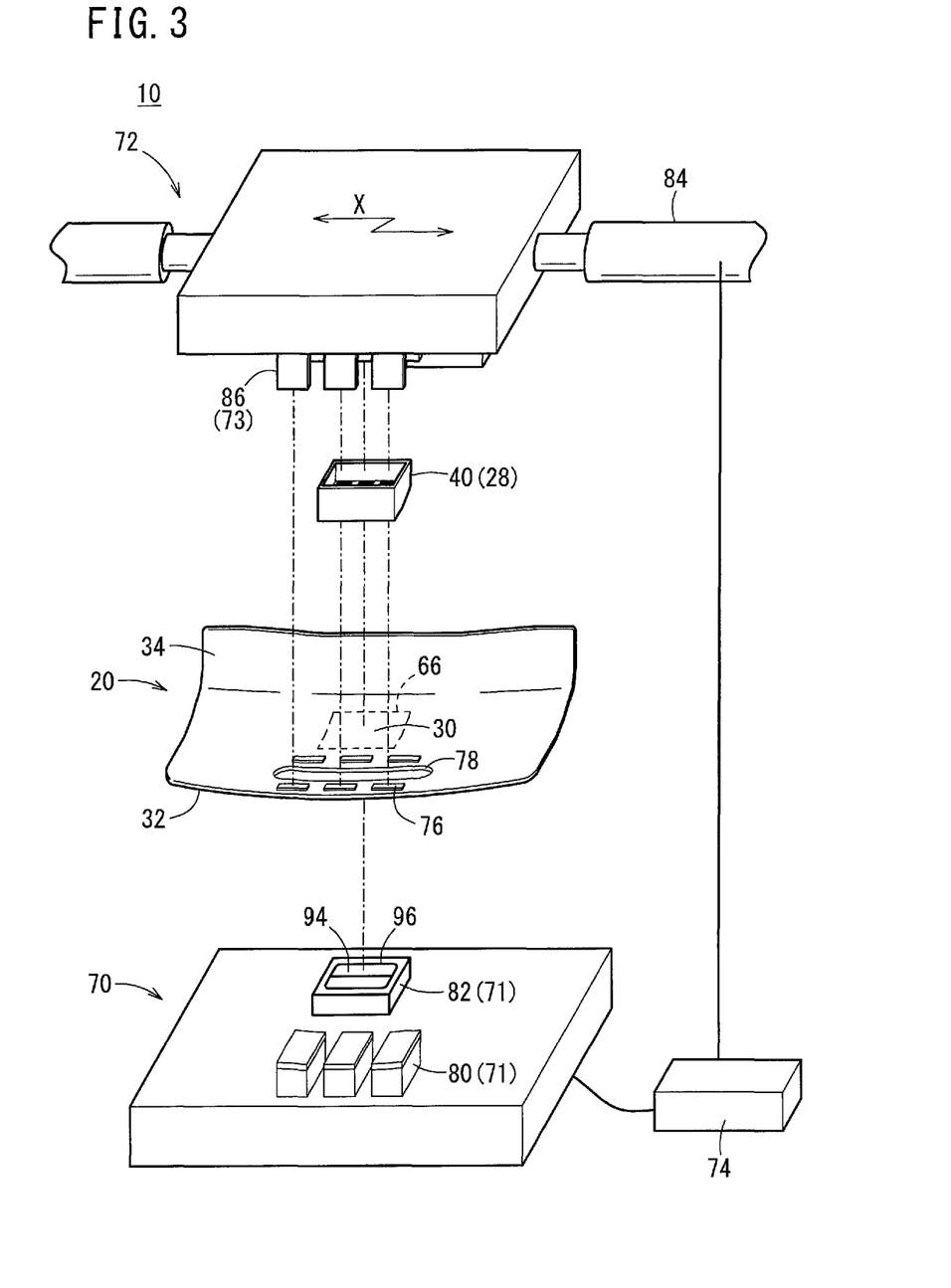
FIG. 3 is a perspective view showing in outline the structure of the vibration welding device.

Next, a detailed description will be made concerning vibration welding of the instrument panel 20 and the airbag unit 28 (retaining box 40). As already noted, the instrument panel 20 and the airbag unit 28 are joined by performing vibration welding using a vibration welding device 10. The vibration welding device 10, for example as shown in FIG. 3, is equipped with a base plate 70, a vibration plate 72, and a control unit 74.

The base plate 70 is a member that supports the instrument panel 20 during vibration welding, and is configured to be capable of rising and lowering with respect to the floor under an action of the control unit 74. Multiple jigs 71 are disposed independently on an upper surface of the base plate 70. The jigs 71 include a function to position the instrument panel 20 in a predetermined posture, and furthermore support the locations to be vibration welded from a lower side thereof. The jigs 71 are constituted from an aluminum material, for example.

In the vibration welding device 10, the instrument panel 20 is arranged on the base plate 70 such that the front surface 32 side thereof faces downward. On the rear surface 34 of the instrument panel 20, other than the aforementioned airbag unit 28, a non-illustrated duct is subjected to vibration welding. Therefore, on the side of the rear surface 34, there are disposed the tear line 66 that corresponds to the airbag unit 28, along with duct attachment parts 76 and a duct hole 78. Vibration welding of the duct is performed in the same manner as the conventional art, and thus explanation thereof is omitted. Further, other interior components may be attached to the rear surface 34 side of the instrument panel 20. The retaining box 40 of the airbag unit 28, prior to vibration welding thereof, is positioned on the tear line 66 of the instrument panel 20 by a non-illustrated positioning jig (or alternatively, manually by an operator).

As the jigs 71 of the base plate 70, there may be cited, for example, duct lower side jigs 80 that are arranged at positions below the duct attachment parts 76, and a support jig 82 (fixing part) that is provided at a position below the airbag unit 28.

On the other hand, the vibration plate 72 is connected to a vibration applying means 84 at a position above the base plate 70. On a lower surface of the vibration plate 72, vibration-capable jigs 73 are disposed at positions facing toward the respective jigs 71 of the base plate 70.

As the jigs 73 of the vibration plate 72, there may be cited, for example, duct upper side jigs 86 that are arranged at positions above the duct attachment parts 76, and a vibration-applying jig 88 (see FIG. 5) that is arranged at a position above the airbag unit 28. The support jig 82 and the vibration-applying jig 88, by raising of the base plate 70, are capable of sandwiching and applying a predetermined pressure to the instrument panel 20 and the retaining box 40. The pressure can be controlled by the control unit 74.

Further, under an action of the vibration applying means 84, the vibration plate 72 is vibrated in a lateral direction (e.g., in left and right directions of the instrument panel 20, or in the X directions shown in FIG. 3) relatively with respect to the base plate 70. By receiving vibrations from the vibration plate 72, the duct upper side jigs 86 and the vibration-applying jig 88 are capable of applying a predetermined vibratory force to the retaining box 40 and the instrument panel 20. The vibration conditions (amplitude, frequency, vibration time, etc.) of the duct upper side jigs 86 and the vibration-applying jig 88 are controlled suitably by the control unit 74.

Figure 4:
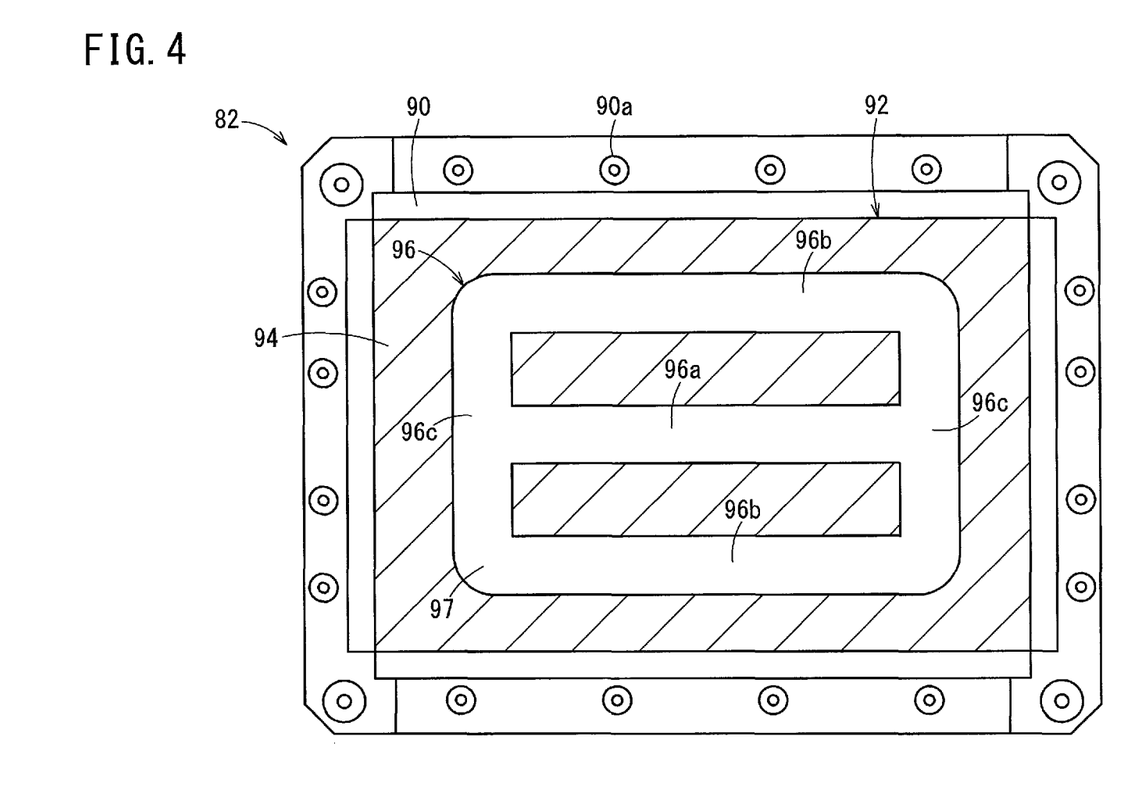
FIG. 4 is a plan view showing a support jig of the vibration welding device of FIG. 3.

Next, the support jig 82 that supports the airbag mounting portion 30 of the instrument panel 20 will be described in detail with reference to FIG. 4. The support jig 82 includes a function to suitably vibration weld the airbag unit 28 to the instrument panel 20.

The support jig 82 includes a frame member 90 fixed to the base plate 70, and a support block 92 accommodated in the frame member 90 and which directly supports the instrument panel 20. The frame member 90 of the support jig 82 projects upwardly from the upper surface of the base plate 70, and by surrounding the entire circumference of the support block 92, regulates movement in the planar direction of the support block 92. The frame member 90 is formed in a rectangular shape as viewed in plan, corresponding to the shape of the airbag unit 28, and is fixed to the base plate 70 at each side thereof by a plurality of screws 90a.

The support block 92, by being arranged on and fixed to the inner side of the frame member 90, projects out on the upper surface of the base plate 70, and supports the airbag mounting portion 30 of the instrument panel 20. The upper surface of the support block 92 is in surface contact with the instrument panel 20, and serves as a mounting surface 94 for supporting the instrument panel 20.

A groove portion 96 (space), which is constituted by cutting out the support block 92 downwardly at a predetermine depth, is disposed on the mounting surface 94 of the support block 92. In a state in which the instrument panel 20 is fixed in position, the groove portion 96 is formed at a position that overlaps with the tear line 66 of the airbag mounting portion 30, and includes a function to allow a bulge (thermally expanded portion) of the instrument panel 20, which is generated in the vicinity of the tear line 66 during vibration welding.

More specifically, the groove portion 96 includes a first groove 96a facing toward the first line 66a of the tear line 66, second grooves 96b that face toward the second lines 66b, and third grooves 96c that face toward the third lines 66c. The first through third grooves 96a, 96b, 96c are set with the same degree of depth and width. In the vibration welding device 10, when the instrument panel 20 and the support block 92 are vibration welded, the instrument panel 20 is fixed in position, such that a deep part (maximally cutout portion) of the tear line 66 passes through the widthwise center of the groove portion 96.

Figure 5:
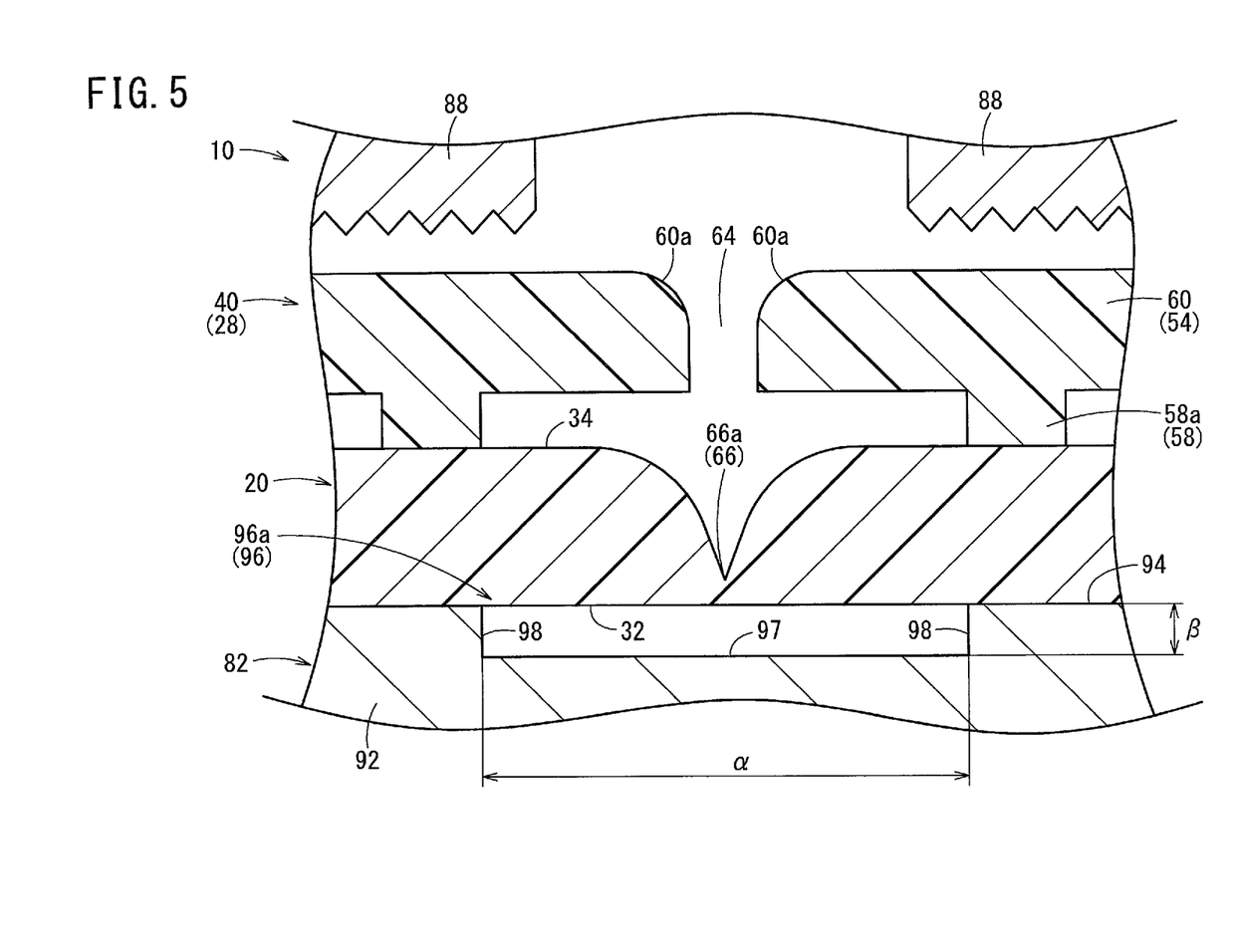
FIG. 5 is a cross-sectional view showing in enlarged form a structure of the vibration welding device that fixes a portion of the instrument panel where a tear line is disposed.

Below, with reference to the cross-sectional view of FIG. 5, a further detailed description will be made concerning the first line 66a of the instrument panel 20 and the vicinity of the first groove 96a of the support jig 82. The relationship between the second and third lines 66b, 66c of the instrument panel 20 and the second and third grooves 96b, 96c of the support jig 82 is basically the same as the relationship between the first line 66a and the vicinity of the first groove 96a, and therefore, detailed description of such features is omitted.

As viewed in cross section, the first groove 96a of the support jig 82 is surrounded by a bottom wall 97 and a pair of side walls 98, and the upper surface thereof is open. The bottom wall 97 of the first groove 96a is formed in a flat shape, and the two side walls 98 in a pair are disposed contiguously in a perpendicular direction with respect to the bottom wall 97.

The first line 66a of the instrument panel 20 is arranged in a center portion in the widthwise direction of the first groove 96a, and is mounted on the mounting surface 94 so as to bridge the first groove 96a. A width α (between the pair of side walls 98) of the first groove 96a according to the present embodiment is set to be wider than the width of the tear line 66 or the gap 64 between the pair of door plates 60. On the other hand, the depth β of the first groove 96a, i.e., a distance from the mounting surface 94 to the bottom wall 97, preferably is set to a degree (also refer to FIG. 6B) that does not come into contact with a thermally expanded portion 20a of the instrument panel 20 at the time of vibration welding.

The retaining box 40 is positioned by a positioning jig or the like so that the gap 64 between the pair of door plates 60 faces toward the first line 66a, and is stacked on the side of the rear surface 34 of the instrument panel 20. Accordingly, the central vicinity in the widthwise direction of the first groove 96a, the first line 66a of the instrument panel 20, and the gap 64 of the retaining box 40 are lined up uniformly in the stacking direction. Further, in a state with the retaining box 40 being fixed in position, the welding parts 58 of the door portions 54 face toward the mounting surface 94 of the support jig 82. Thus, the mounting surface 94 of the support jig 82 is capable of suitably supporting portions (positions facing toward the welding parts 58) of the instrument panel 20 to which vibrations are directly transmitted.

The vibration welding device 10 according to the present invention is constructed basically as described above. Below, operations and advantageous effects of the vibration welding device 10 will be described on the basis of a vibration welding method.

With the vibration welding method, as shown in FIG. 3, at first, the instrument panel 20 is positioned, mounted, and fixed in a surface direction with respect to the base plate 70 of the vibration welding device 10 (fixing step). At this time, the instrument panel 20 is fixed with respect to the support jig 82 so that the tear line 66 of the airbag mounting portion 30 faces upwardly (an opposite surface from the mounting surface 94 of the support jig 82). Further, in the fixed state, as described above, the tear line 66 is arranged at a position that overlaps with the center in the widthwise direction of the groove portion 96 of the support jig 82.

Next, in the vibration welding device 10, the retaining box 40 for the airbag unit 28 is positioned and mounted by a positioning jig with respect to the instrument panel 20. At this time, positioning is performed such that the gap 64 between the pair of door plates 60 overlaps with the first line 66a, the two hinge members 62 overlap with the second lines 66b, and the detached locations between the retaining walls 50 and the door portions 54 overlap with the third lines 66c. The retaining box 40 may be positioned beforehand and fixed provisionally on the instrument panel 20.

Figure 6A:
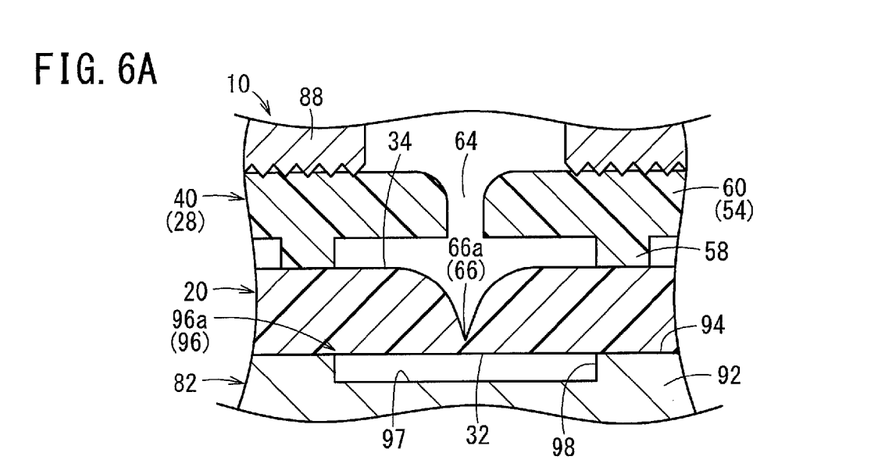
FIG. 6A is a first explanatory drawing for describing operations of the vibration welding device of FIG. 5.

Thereafter, the base plate 70 is raised under an action of the control unit 74, the instrument panel 20 and the retaining box 40 are sandwiched between the vibration-applying jig 88 of the vibration plate 72 and the support jig 82 of the base plate 70, and are pressed therebetween in the stacking direction (refer to FIG. 6A). Consequently, a suitable pressure is applied to the contact surfaces of the welding parts 58 of the retaining box 40 and the rear surface 34 of the instrument panel 20.

In a state in which pressure is applied, under an action of the control unit 74, the vibration plate 72 is vibrated at a predetermined amplitude and a predetermined frequency in the X directions. As a result, a vibratory force is imparted to the retaining box 40 and the instrument panel 20 from the vibration-applying jig 88, frictional heat is generated at the contact surfaces between the welding parts 58 of the retaining box 40 and the rear surface 34 of the instrument panel 20, and vibration welding is carried out (vibration welding step).

Figure 6B:
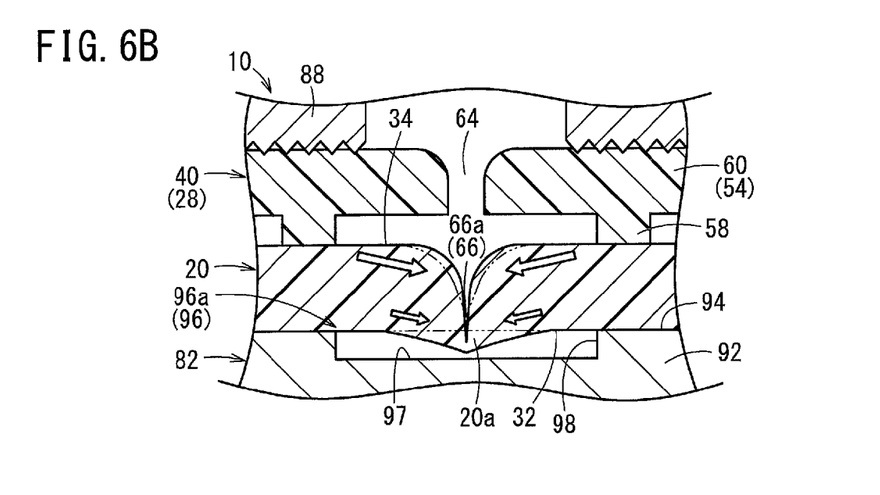
FIG. 6B is a second explanatory drawing, continuing from FIG. 6A, for describing operations of the vibration welding device.

In the vibration welding step, welding heat is transmitted from the vicinity of the welding parts 58 to the instrument panel 20. Therefore, as shown in FIG. 6B, on the instrument panel 20, in the vicinity of the tear line 66 (first line 66a) in close proximity to the welding parts 58, deformation (thermal expansion) is caused due to the influence of heat. In particular, due to such vibration welding, the temperature on the side of the rear surface 34 of the instrument panel 20 increases, and a heat gradient appears in which the temperature lowers toward the side of the front surface 32 of the instrument panel 20. Therefore, the wall portion near the rear surface 34 of the instrument panel 20 acquires greater fluidity, whereas the wall portion near the front surface 32 of the instrument panel 20 acquires lower fluidity (refer to the white arrows in FIG. 6B). Consequently, the thermally expanded portion 20a of the instrument panel 20 in the vicinity of the tear line 66 moves toward the side of the groove portion 96 (first groove 96a), and during vibration welding, the location where the tear line 66 of the instrument panel 20 is formed projects outwardly in the shape of a chevron in the direction (downward direction) of the bottom wall 97 of the groove portion 96.

After completion of vibration welding, the base plate 70 is lowered under an action of the control unit 74, whereupon sandwiching between the support jig 82 and the vibration-applying jig 88 is released. In addition, the instrument panel 20 and the retaining box 40 undergo natural cooling, whereby an action takes place so that the thermally expanded portion 20a, which had acquired fluidity at the time of vibration welding, returns. At this time, since the temperature was higher near the rear surface 34 than near the front surface 32, the wall portion near the rear surface 34 of the instrument panel 20 has greater fluidity, whereas the wall portion near the front surface 32 of the instrument panel 20 has lower fluidity (refer to the white arrows in FIG. 6C).

Figure 6C:
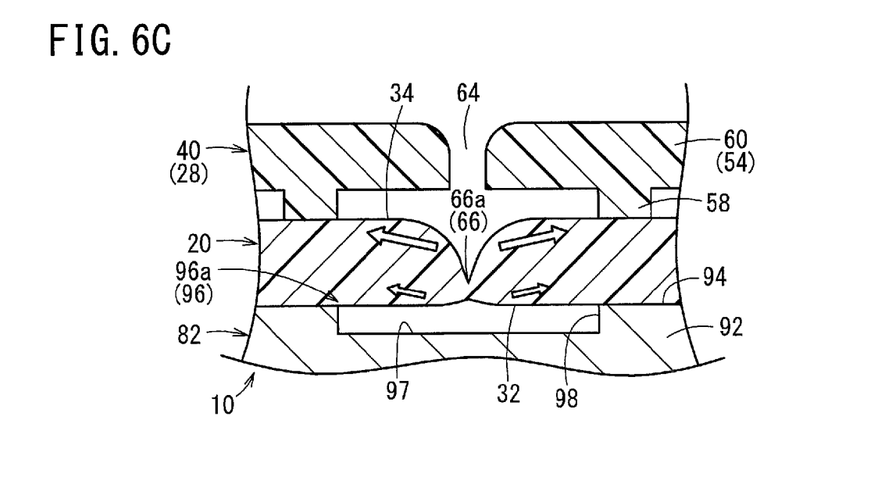
FIG. 6C is a third explanatory drawing, continuing from FIG. 6B, for describing operations of the vibration welding device.

Therefore, as shown in FIG. 6C, the location where the tear line 66 of the instrument panel 20 is formed undergoes displacement so as to separate away from the groove portion 96 (bottom wall 97). The amount of displacement of the instrument panel 20 can be controlled to an appropriate amount by the shape of the groove portion 96. The front surface 32 of the instrument panel 20, in a state after cooling thereof (at normal temperature), can be restored exactly to its position prior to vibration welding. More specifically, after completion of vibration welding, the front surface 32 of the instrument panel 20 can be restored to a smooth surface in which a depression (deformity) thereof is almost unnoticeable. Further, in the groove portion 96 of the support jig 82, after vibration welding, residual heat of the instrument panel 20 can suitably escape, and restoration of the instrument panel 20 can take place in a short time.

Figure 7A:
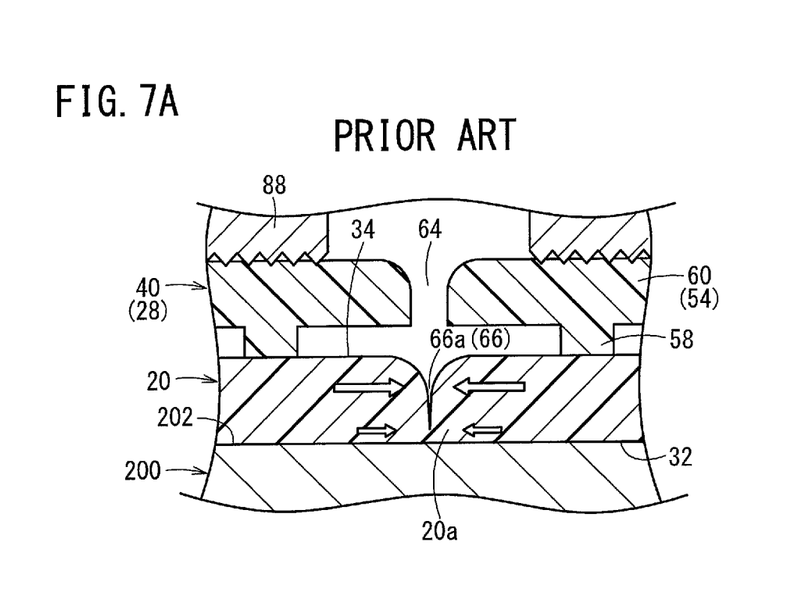
FIG. 7A is a first explanatory drawing for describing operations of a conventional vibration welding device.
Figure 7B:
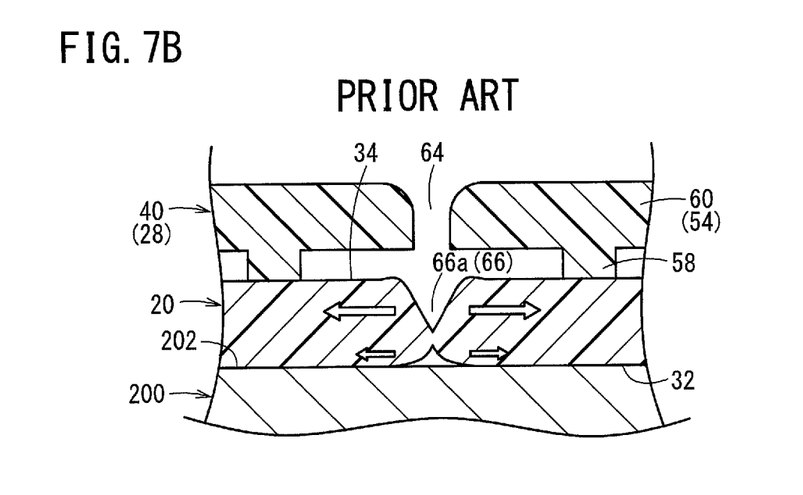
FIG. 7B is a second explanatory drawing, continuing from FIG. 7A, for describing operations of the conventional vibration welding device.

Based on FIGS. 7A and 7B, a description will be made concerning a support jig 200 of a conventional vibration welding device. A mounting surface 202 of the instrument panel 20 of the support jig 200 is constituted with a flat surface that does not have the groove portion 96 according to the present embodiment. Further, in the mounting surface 202, there is no portion into which the thermally expanded portion 20a of the instrument panel 20 can escape downwardly at the time of vibration welding. Therefore, during vibration welding, due to the welding heat of the instrument panel 20, a phenomenon occurs in which the wall portions on the side of the rear surface 34 of the instrument panel 20 where the tear line 66 is sandwiched acquire greater fluidity, whereas the wall portion on the side of the front surface 32 acquires almost no fluidity. Stated otherwise, at the time of vibration welding, the instrument panel 20 is subjected to an action such that a top side opening of the tear line 66 is narrowed.

When the instrument panel 20 undergoes cooling after completion of vibration welding, although the wall portion on the side of the rear surface 34 where the tear line 66 has been narrowed upwardly has greater fluidity, due to the lower fluidity of the wall portion on the side of the front surface 32, an action takes place such that the tear line 66 on the side of the rear surface 34 widens significantly. Consequently, the front surface 32 of the instrument panel 20 undergoes displacement by being pulled toward the side of the rear surface 34, and is deformed such that the location where the tear line 66 is formed warps or bends backward. As a result, a depression (deformity) is generated on the front surface 32 side of the instrument panel 20.

In contrast thereto, in the vibration welding device 10 according to the present embodiment, as shown in FIGS. 6B and 6C, by the groove portion 96 being disposed at a position that overlaps with the tear line 66, movement of the thermally expanded portion 20a of the instrument panel 20 at the time of vibration welding can be permitted. Consequently, the front surface 32 side of the instrument panel 20 after completion of vibration welding can be constructed with a smooth surface without the occurrence of any depression therein.

In this case, at the time of vibration welding, the amount of displacement of the thermally expanded portion 20a of the instrument panel 20 that enters into the groove portion 96 side is an important factor. Although the amount of displacement is influenced by the amount of heat at the time of vibration welding or the shape of the tear line 66, in the vibration welding device 10 according to the present embodiment, on the premise that the above elements are the same, the amount of displacement is adjusted by the width α of the groove portion 96. Below, with reference to FIGS. 8A and 8B, the relationship between the width α of the groove portion 96 and the amount of displacement of the instrument panel 20 will be explained.

Figure 8A:
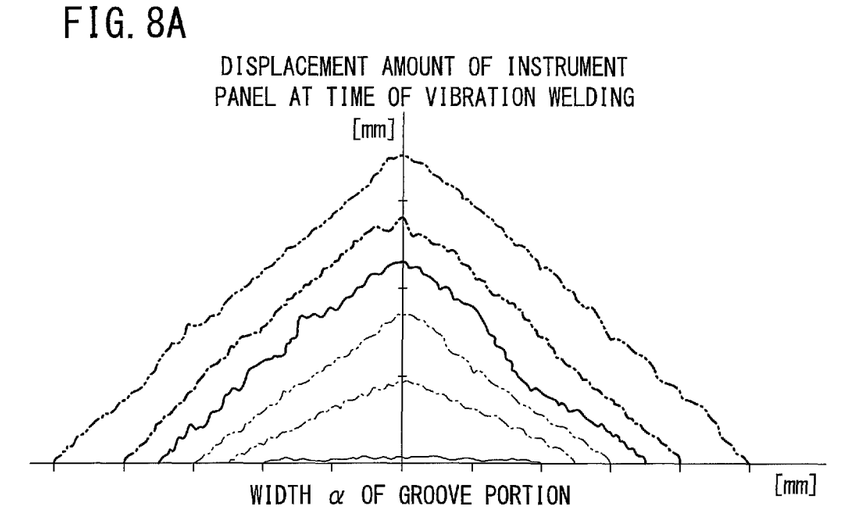
FIG. 8A is a graph showing a displacement amount of an instrument panel corresponding to the width of a groove portion at a time of vibration welding.

The graph of FIG. 8A shows an amount of displacement of the instrument panel 20 corresponding to the width α of the groove portion 96 at a time of vibration welding, wherein the vertical axis represents the displacement amount of the front surface 32 of the instrument panel 20, and the horizontal axis represents the width α of the groove portion 96. Further, in the graphs of FIGS. 8A and 8B, the thin solid line, the thin one-dot dashed line, the thin two-dot dashed line, the thick solid line, the thick one-dot dashed line, and the thick two-dot dashed line are shown in order from the width α of the groove portion 96 being narrowest to the width α thereof being widest.

As indicated by the thin solid line of FIG. 8A, in the case that the width α of the groove portion 96 is sufficiently narrow, almost no displacement of the front surface 32 of the instrument panel 20 takes place during vibration welding. In addition, when the width α of the groove portion 96 widens to and beyond a predetermined level, it is understood that the displacement amount of the front surface 32 of the center portion (deep part of the tear line 66) increases in succession.

Figure 8B:
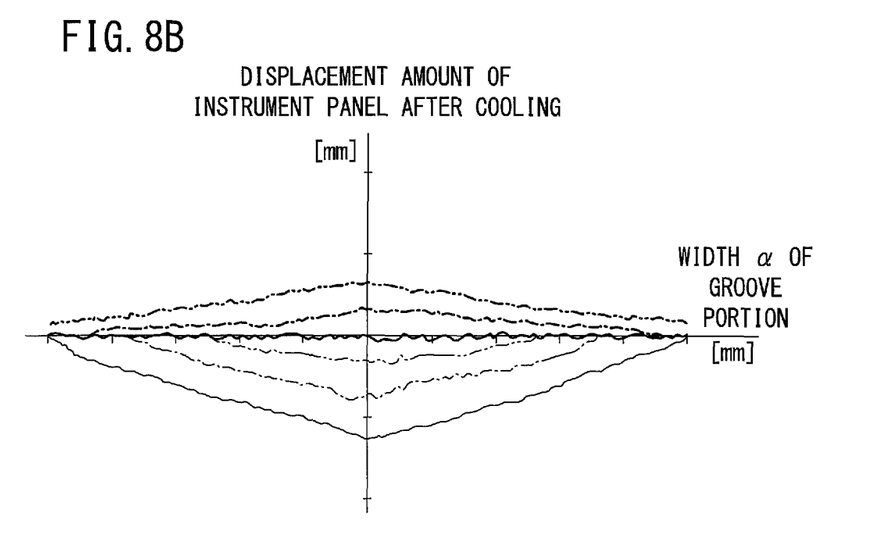
FIG. 8B is a graph showing a displacement amount of a surface of the instrument panel corresponding to the width of the groove portion when cooling takes place after vibration welding.

The graph of FIG. 8B shows the displacement amount of the front surface 32 of the instrument panel 20 corresponding to the width α of the groove portion 96 when cooling takes place after vibration welding. The respective lines correspond to different widths α of the groove portion 96 in the same manner as the lines shown in FIG. 8A. In FIG. 8B, the case in which the displacement amount on the vertical axis is negative indicates a situation in which the front surface 32 of the instrument panel 20 is displaced to the side of the rear surface 34 (a state in which the front surface 32 is warped or bent backward). Conversely, the case in which the displacement amount on the vertical axis is positive indicates a situation in which the front surface 32 of the instrument panel 20 projects out toward the side of the groove portion 96.

From these facts, it can be understood that if the width α of the groove portion 96 is narrow (the thin solid line, the thin one-dot dashed line), the front surface 32 of the instrument panel 20 is displace so as to be bent inwardly. Further, it can be understood that if the width α of the groove portion 96 is wide (the thick two-dot dashed line), the projecting state of the front surface 32 toward the side of the groove portion 96 remains to a slight degree. Additionally, the cases of the thin two-dot dashed line, the thick solid line, and the thick one-dot dashed line reside within a range of error in which almost no influence is imparted to the external appearance of the instrument panel 20, and the shape thereof returns near to its original position. In particular, it can be understood that when the width α of the groove portion 96 is as shown by the thick solid line, the front surface 32 of the instrument panel 20 acquires a substantially flat shape. In other words, by adjusting the width of the groove portion 96, the front surface 32 of the instrument panel 20 can be placed in a state that exhibits almost no deformation.

As described above, with the vibration welding device 10 and the vibration welding method according to the present embodiment, by means of a simple structure including the groove portion 96 disposed at a position overlapping with the tear line 66 of the instrument panel 20, after vibration welding, deformation of the instrument panel 20 can be suppressed significantly. More specifically, even though the location where the tear line 66 of the instrument panel 20 is formed undergoes thermal expansion due to the heat generated during vibration welding, the thermally expanded portion 20a is capable of escaping into the groove portion 96 on the side opposite from the tear line 66 (i.e., the front surface 32 side of the instrument panel 20). As a result, when cooling takes place after vibration welding, the thermally expanded portion 20a of the instrument panel 20 that has moved into the groove portion 96 is suitably returned to its original location. Thus, after vibration welding, the instrument panel 20 exhibits superior product quality without any (or almost no noticeable) depression or the like.

In this case, by fixing the instrument panel 20 so that the support jig 82 is positioned centrally in the widthwise direction of the groove portion 96, during vibration welding, the vibration welding device 10 is capable of allowing the thermally expanded portion 20a in the vicinity of the tear line 66 of the instrument panel 20 to escape evenly into the groove portion 96. Thus, after cooling upon completion of vibration welding, the instrument panel 20 can return evenly, and the product quality of the instrument panel 20 can be further improved. Further, by fixing the retaining box 40 so that the groove portion 96 is positioned between the welding parts 58, the thermally expanded portion 20a of the instrument panel 20 due to the influence of heat effect of the welding parts 58 generated during vibration welding can be made to move reliably into the groove portion 96.

The vibration welding device 10 according to the present invention is not limited to the embodiment described above, and various modifications thereto can be adopted. Below, descriptions will be given concerning some of modifications of the vibration welding device 10. In the descriptions given below, structural features thereof having the same configuration or the same function as those of the vibration welding device 10 according to the present embodiment are designated by the same reference characters, and detailed description of such features is omitted.

First Modification

A support jig 82A according to a first modification, as shown in FIGS. 9A through 9D, is equipped with a position adjusting mechanism 102 (position adjusting unit) capable of adjusting the width α and the position of a groove portion 100. The position adjusting mechanism 102 includes a plurality of divided sub-blocks 106 into which a support block 104 is divided, and block position fixing members 108 that enable the respective sub-blocks 106 to be moved relative to the base plate 70 and to be fixed in arbitrary positions.

The sub-blocks 106 include a function to individually narrow or widen first through third grooves 100a, 100b, 100c of the groove portion 100. In this case, a support block 104a that surrounds the groove portion 100 close to the frame member 90 is divided into four sub-blocks 106 corresponding to the adjacent second and third grooves 100b, 100c. On the other hand, two support blocks 104b that are surrounded by the second and third grooves 100b, 100c are each divided into six sub-blocks 106 corresponding to the first through third grooves 100a, 100b, 100c.

The block position fixing members 108 are constituted respectively from position adjusting elongate holes 110 disposed in the base plate 70, and fixing screws 112, which are screwed respectively into the sub-blocks 106. Movements of the sub-blocks 106 are guided along the position adjusting elongate holes 110, and by tightening the fixing screws 112, the sub-blocks 106 are fixed at predetermined positions.

Figure 9A:
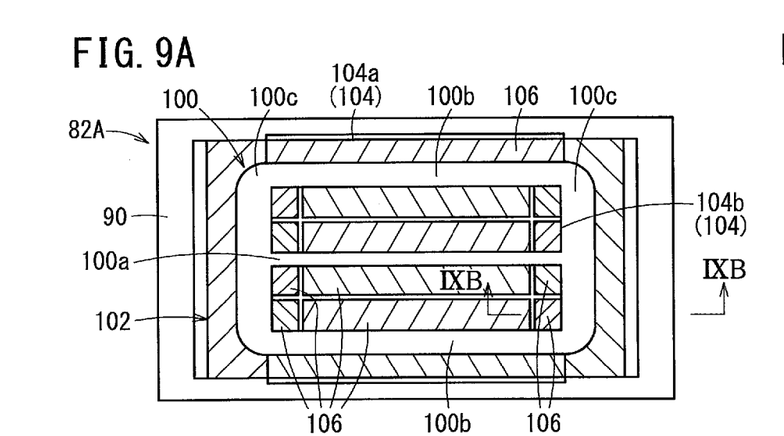
FIG. 9A is a plan view of a support jig according to a first modification.
Figure 9B:
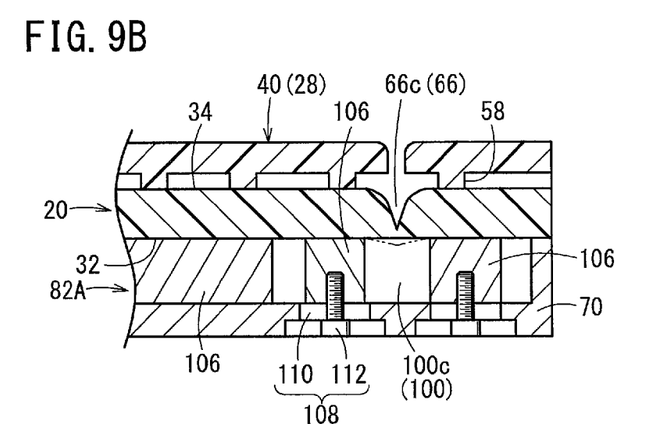
FIG. 9B is a cross-sectional view taken along line IXB-IXB of FIG. 9A.
Figure 9C:
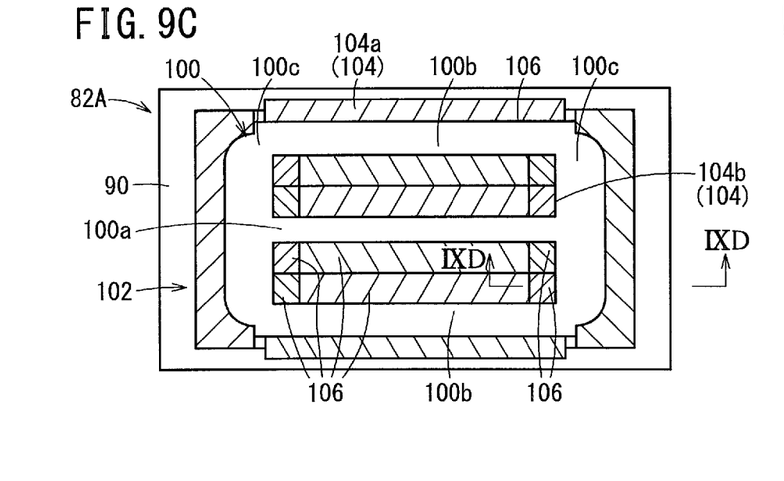
FIG. 9C is a plan view showing a condition in which a groove portion of the support jig according to the first modification is widened.
Figure 9D:
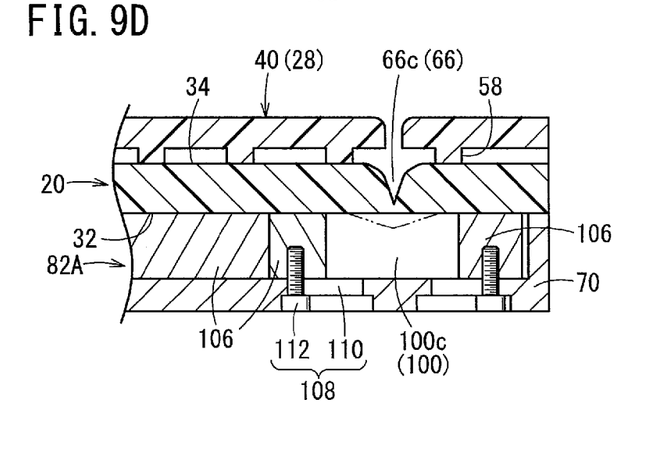
FIG. 9D is a cross-sectional view taken along line IXD-IXD of FIG. 9C.

In setting the width of the groove portion 100, in the case that a deformity occurs on the front surface 32 of the instrument panel 20 due to the groove portion 100 being narrow as shown in FIG. 9A, the fixing screws 112 of the block position fixing members 108 are loosened, and the sub-blocks 106 are moved. Accordingly, the width of the groove portion 100 is widened as shown in FIG. 9C, and then the sub-blocks 106 are fixed by the block position fixing members 108. At this time, by the aforementioned support block 104 being divided into the sub-blocks 106, the groove widths of the first through third grooves 100a, 100b, 100c can all be changed evenly.

Consequently, by widening the thickness of the groove portion 100, during vibration welding, the amount of displacement of the front surface 32 side of the instrument panel 20 on which the tear line 66 is provided can be set to an appropriate amount. In this manner, by providing the position adjusting mechanism 102 that enables a width or position of the groove portion 100 to be adjusted, the vibration welding device 10 is capable of suitably adjusting the amount at which the instrument panel 20 is displaced corresponding to the width of the groove portion 100. Accordingly, the condition of the instrument panel 20 after vibration welding can easily be adjusted. Further, corresponding to the heat at the time of vibration welding or the condition (material or thickness, etc.) of the instrument panel 20, since the need to prepare a plurality of support jigs 82 is eliminated, versatility of the vibration welding device 10 is increased.

Second Modification

Figure 10A:
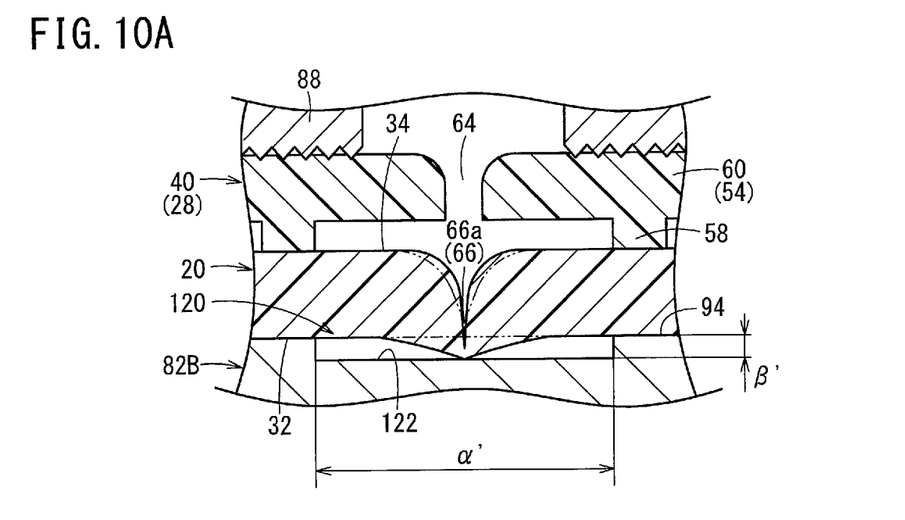
FIG. 10A is a cross-sectional view of a support jig according to a second modification.

A support jig 82B according to a second modification, as shown in FIG. 10A, is of a configuration in which a width α' of a groove portion 120 is set comparatively wide, and a depth β' of the groove portion 120 is set shallowly. The depth β' of the groove portion 120 is of a degree that enables a bottom wall 122 to contact the front surface 32 of the instrument panel 20 at the time of vibration welding. Consequently, even though the width α' of the groove portion 120 is formed to be wide, when vibration welding is conducted, the amount of displacement of the front surface 32 of the instrument panel 20 is regulated by the bottom wall 122. As a result, accompanying cooling upon completion of vibration welding, the front surface 32 of the instrument panel 20 is able to return to a substantially flat shape.

Third Modification

Figure 10B:
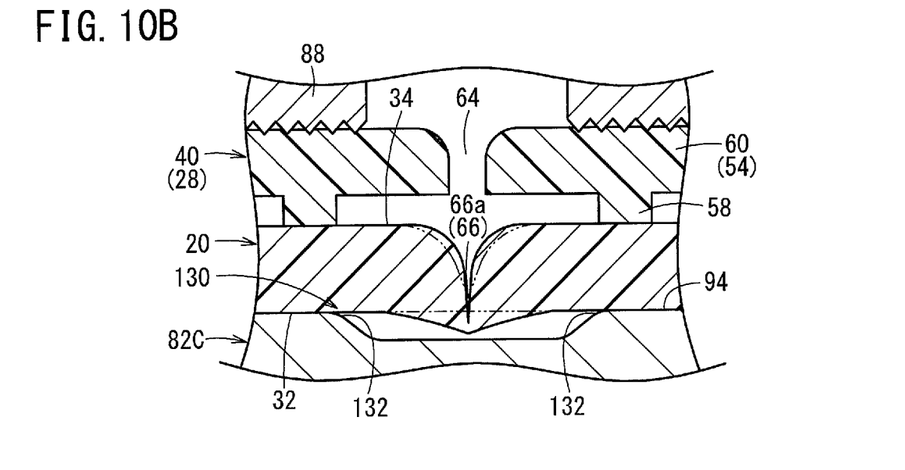
FIG. 10B is a cross-sectional view of a support jig according to a third modification.

With a support jig 82C according to a third modification, as shown in FIG. 10B, the edge of a groove portion 130 is formed with rounded corners 132. The groove portion 130 that is formed with such rounded corners 132 is capable of suppressing localized pressure on the front surface 32 of the instrument panel 20, when sandwiched between the support jig 82C and the vibration applying jig 88. Therefore, even though vibration welding is carried out, it is possible to reduce the possibility for marks or the like to be formed on the front surface 32 of the instrument panel 20.

Although a preferred embodiment of the present invention has been described above, the present invention is not limited to this embodiment, and it goes without saying that various modifications can be adopted within a scope that does not depart from the essential gist of the present invention. For example, the vibration welding device 10 is not limited to being applied to vibration welding of the instrument panel 20 and the airbag unit 28, and can suitably be applied to vibration welding of other workpieces having cutout portions such as grooves or holes, etc., therein.

The invention claimed is:

1. A vibration welding device with which a first workpiece having a cutout portion therein, and a second workpiece are stacked and vibration welded, comprising:
a fixing part configured to place and fix the first workpiece thereon, so that the cutout portion of the first workpiece faces toward the second workpiece during vibration welding;
wherein the fixing part comprises a space configured to allow thermal expansion of the first workpiece during vibration welding, at a position overlapping with the cutout portion of the first workpiece in a fixed state of the first workpiece.

2. The vibration welding device according to claim 1, wherein the fixing part fixes the first workpiece, for a deep part of the cutout portion to be located in a central portion in a widthwise direction of the space.

3. The vibration welding device according to claim 1, wherein the fixing part comprises a position adjusting mechanism configured to enable a width or position of the space to be adjusted.

4. The vibration welding device according to claim 1, wherein:
the second workpiece comprises a plurality of welding parts; and
the space is disposed between the welding parts in a fixed state of the second workpiece.

5. The vibration welding device according to claim 1, wherein:
the first workpiece is an instrument panel of an automobile;
the second workpiece is a retaining member of an airbag to be deployed into interior of the automobile at a predetermined timing, the retaining member configured to be welded to the instrument panel; and
the cutout portion is a breakable portion to be broken accompanying deployment of the airbag.

6. A vibration welding method by which a first workpiece having a cutout portion therein, and a second workpiece are stacked and vibration welded, comprising:
a fixing step of fixing the first workpiece with respect to a fixing part that is capable of placing and fixing the first workpiece so that the cutout portion thereof faces toward the second workpiece, and so that the cutout portion overlaps with a space of the fixing part; and
a vibration welding step of, after the fixing step, vibration welding the first workpiece and the second workpiece by applying a vibration force to the first and second workpieces, while allowing thermal expansion of the first workpiece to escape into the space.

* * * * *